United States Patent [19]

Remy

[11] 3,967,082
[45] June 29, 1976

[54] FLUID PRESSURE DROP INDICATOR FOR THE HYDRAULIC BRAKING SYSTEM OF A VEHICLE

[75] Inventor: Patrick Remy, Boulogne-Billancourt, France

[73] Assignees: Regie Nationale des Usines Renault; Automobiles Peugeot, both of Boulogne-Billancourt, France

[22] Filed: Feb. 20, 1975

[21] Appl. No.: 551,398

[30] Foreign Application Priority Data

Feb. 25, 1974 France .............................. 74.06271

[52] U.S. Cl. ............................ 200/82 D; 340/52 C; 303/6 C
[51] Int. Cl.² ........................................ H01H 35/38
[58] Field of Search ............... 116/70, 117 R, 127; 188/1 A, 151 A; 73/239, 248, 419; 200/82 D; 303/6 C, 84 A; 340/52 C, 242

[56] References Cited
UNITED STATES PATENTS

| | | | |
|---|---|---|---|
| 3,597,008 | 8/1971 | Falk | 200/82 D |
| 3,608,977 | 9/1971 | Kersting | 200/82 D |
| 3,669,506 | 6/1972 | Papin | 200/82 D |
| 3,836,204 | 9/1974 | Wicklin, Jr. | 340/52 C |

Primary Examiner—Gerald P. Tolin
Attorney, Agent, or Firm—Fleit & Jacobson

[57] ABSTRACT

A pressure drop indicator for a braking system comprising two independent circuits, one of said circuits comprising a pressure limiter, said indicator comprising a body formed with a bore, a movable member slidably mounted in said bore and responsive to the pressure in both circuits, said movable member being adapted to co-act with a control element of an electric switch so as to close an electric signal circuit in case of fluid leakage in one of said circuits, said movable member comprising a first piston provided with a rod movable in a bore formed in the other or second piston, said second piston being adapted to co-act with said electric switch control element between two axial abutment positions, said piston providing at the ends of said bore in said body first and second chambers to which the feed lines of said first and second circuits are adapted to be connected, said second circuit comprising said pressure limiter, the pressure drop indicator being characterized in that the end of the rod of said first piston comprises a valve portion adapted to close a passsage hole formed in said second piston to provide a fluid passage between said second chamber and an auxiliary chamber for supplying fluid to the second circuit and by-pass said pressure limiter when a pressure drop takes place in said first circuit.

1 Claim, 3 Drawing Figures

FLUID PRESSURE DROP INDICATOR FOR THE HYDRAULIC BRAKING SYSTEM OF A VEHICLE

This invention relates to means for signalling a pressure drop in a braking system of the hydraulically operated type comprising two separate or independent circuits, in order to warn an operator or driver of a state of unbalance between the supply pressures of the two circuits and sense fluid leakages in one or the other circuits of the system.

Pressure drop indicators are already known which comprise a piston movable in a body and responsive to a pressure differential between the circuits so as to move and thus coact with a contact member to close an electric circuit controlling the operation of adequate signal means. These known pressure drop indicators comprise a normally inoperative piston adapted to be moved when applying the brakes but only when a pressure drop occurs in one of the two circuits. Under these conditions, it is clear that the piston movement is only occasional and that the operation of the pressure drop indicator must be checked at regular intervals to avoid serious inconveniences as those arising as a consequence of the seizing of a piston in case an actual failure occurred in the braking system.

Moreover, another function devolved to many pressure drop indicators in braking systems incorporating a pressure limiting device in one of the dual circuits consists in short-circuiting or by-passing this limiting device in case of failure in the other circuit, so that the maximum braking force be available in the circuit still in operation.

It is the essential object of the present invention to provide a pressure drop indicator capable of avoiding the risk of piston seizing mentioned hereinabove while achieving the above-mentioned function of a pressure limiter by-passing or short-circuiting device, by using particularly simple and reliable means.

The pressure drop indicator according to this invention for a braking system comprising two independent circuits, one of said circuits comprising a pressure limiter, said indicator comprising a body formed with a bore, a movable member slidably fitted in said bore and responsive to the pressure in both circuits and adapted to coact with an electric switch for closing an electric signal circuit, said movable member consisting of first and second pistons, said first piston having a rod movable in a bore of said second piston, said second piston being adapted to coact with said switch between two axial abutment positions, said first and second pistons forming at the ends of said body first and second chambers to which supply lines of said first and second circuits are adapted to be connected, respectively, said second circuit comprising a pressure limiting device, is characterised essentially in that the end of the rod of said rod of said first piston carries a valve means for closing an orifice formed in said second piston in order to provide a fluid passage between said second chamber and an auxiliary chamber along the path through which said second circuit is supplied when by-passing said pressure limiter during a pressure drop occurring in said first circuit.

Thus, upon each normal brake application, both pistons can accomplish without any incident a predetermined movement to close the pressure limiter by-pass circuits and avoid the undesired seizing of parts without actuating the switch, whereas in case of failure in one of the dual independent circuits, said switch is actuated in one or the other of said abutment positions while keeping said pressure limiter by-pass open when the failure takes place in the first circuit.

A typical form of embodiment of a pressure drop indicator according to this invention will now be described in detail and by way of example with reference to the accompanying drawing, in which.

Figures 1, 2, 3:
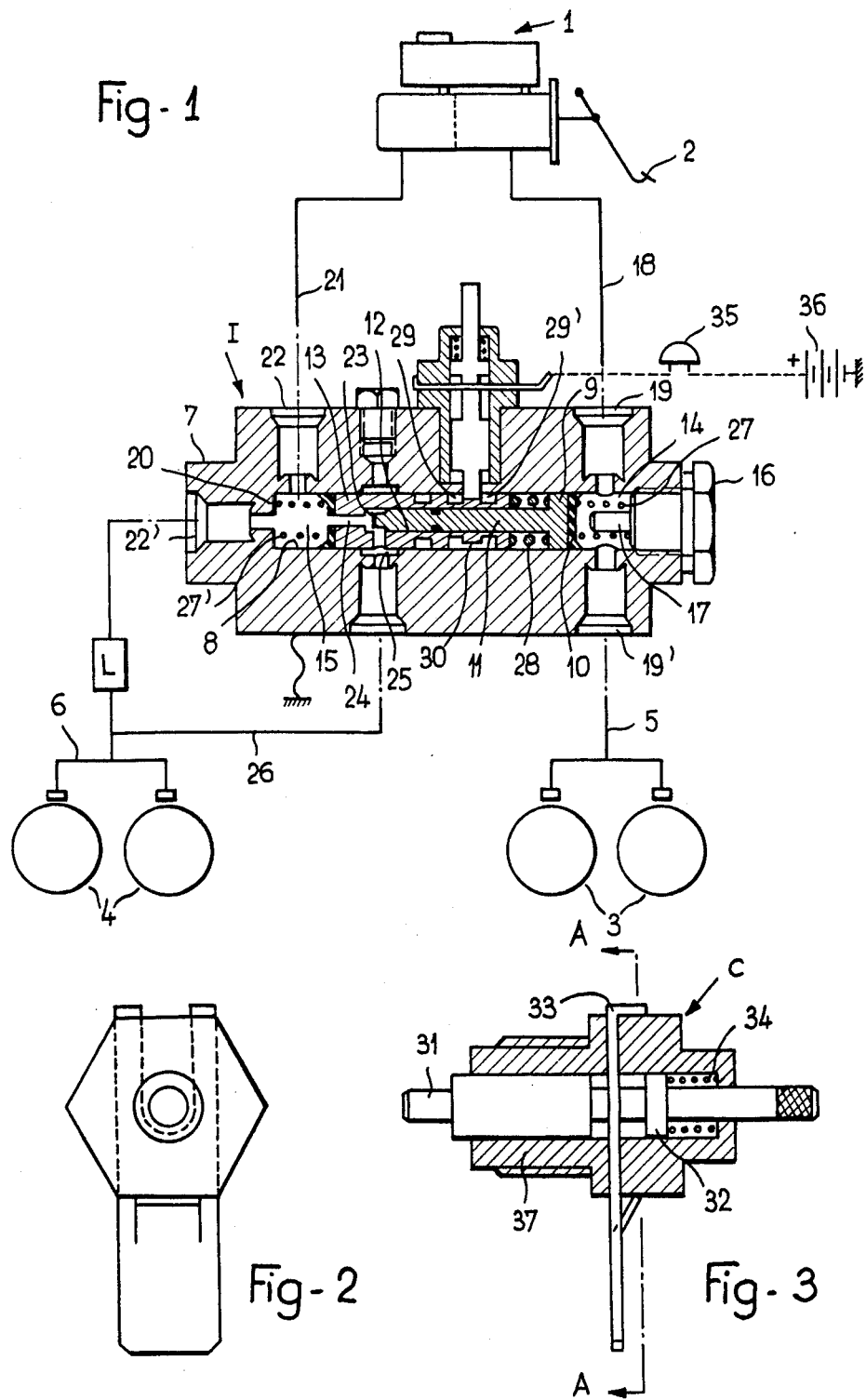
FIG. 1 is a diagrammatic view showing the pressure drop indicator in longitudinal axial section.
FIG. 2 is a vertical section of the electric switch.
FIG. 3 is a horizontal section, taken along the line A—A of FIG. 2, of the electric switch.

In the drawing, a master cylinder of the tandem type is shown diagrammatically at 1 and its control pedal 2 when actuated causes two separate pressures to be transmitted to the front wheel brakes 3 and rear wheel brakes 4, respectively, via a first brake circuit 5 and a second brake circuit 6, in which circuits the pressure drop indicator I is inserted.

This pressure drop indicator I comprises a body 7 formed with a longitudinal bore 8 and a movable member 9 slidably mounted in said bore.

This movable member 9 comprises a first piston 10 provided with a rod 11 movable in a bore 12 formed in a second piston 13 coaxial to piston 10. The first piston 10 and second piston 13 form at their opposite ends a pair of chambers 14 and 15 in said body 7.

The first chamber 14 is closed in the axial direction by a plug 16 provided with a piston stop member 17. The feed line 18 is connected to the primary chamber of said tandem master cylinder 1 and opens into said chamber 14 via an inlet port 19. In this specific example, the outlet port 19' aligned with said inlet port 19 is connected to the first braking circuit supplying hydraulic fluid to the front brake cylinders 3. The second chamber 15 is bounded axially by the bottom 20 of bore 8. The other feed line 21 is connected to the secondary chamber of said tandem master cylinder 1 and opens into said chamber 15 via an inlet port 22. The outlet port 22' is connected to the second braking circuit 6 via a braking pressure correcting device L consisting for example a pressure limiter of a type known per se.

The tandem master cylinder 1 and pressure correcting device L are no part of the present invention and may be of any known and suitable type. It has already been disclosed in the U.S. Pat. No. 3,251,186 an exemplary embodiment of a pressure limiter and in the French Pat. No. 1,518,105 a typical form of embodiment of such tandem master cylinder.

The end of piston rod 11 carries a valve portion 23 adapted to seal a passage hole 24 for the hydraulic fluid between the second chamber 15 and an auxiliary chamber 25 opening into a by-pass line 26 adapted to supply fluid directly to the rear wheel brake cylinders 4.

Both pistons 10 and 13 are held in a state of equilibrium by spring means 27, 27' and 28 housed in each one of said chambers 14 and 15, and between the inoperative end faces of said pistons, respectively. Spring 28 is preponderant and urges the aforesaid inoperative faces constantly away from each other while keeping the passage hole 24 uncovered.

The other or second piston 13 comprises a pair of peripheral grooves 29, 29' separated by a cylindrical rib 30 engaged by the tip of the movable plunger or core 31 of a switch C. This switch C may be screwed or otherwise secured in the body of said indicator I and its plunger 31 comprises a shoulder 32 constituting the movable contact of said switch C. The fixed contact of switch C consists of a metal strip 33 formed with a notch permitting the passage of said plunger 31. The electric contact is obtained as a consequence of the movement of said second piston 13 and the engagement of said plunger 31 into one of the grooves 29, 29' of said second piston 13, provided that the distance between said shoulder 32 and said strip 33 be less than the depth of said grooves 29 or 29'.

A spring 34 interposed between said shoulder 32 and the insulating body 37 of switch C provides the necessary pressure between the electric contacts and warrants the proper operation of the light or sound indicator or like signal means 35 connected between the terminal of a battery 36 and the strip 33 when the indicator body is grounded.

During a normal brake application not attended by any fluid leakage, when the driver depresses the brake pedal 2 the fluid pressure rises in both chambers 14 and 15. The first piston 10 is thus moved to the left due to the force exerted by the hydraulic fluid in chamber 14. Then valve end 23 engages the passage hole 24 and consequently the auxiliary chamber 25 is isolated from the second chamber 15. During the movement of piston 10 the second piston 13 was moved only very slightly due to the fluid communication existing between chambers 15 and 25, so that said piston 13 is displaced just enough to avoid the seizing thereof but not sufficiently to actuate the signal means 35.

If, as a consequence of a leakage occurring in the first braking circuit 5 the pressure developing in chamber 14 becomes lower than the control pressure produced in chamber 15, the second piston 13 will move to the right, as seen in the drawing, and plunger 31 will engage groove 29. No appreciable resistance is offered by the spring 27 since its only function consists in centering the movable member 9 in its bore with the assistance of spring 27'. The spring 27 will firstly be compressed as a consequence of the thrust exerted by the second piston 13 and transmitted to spring 28 and also to the first piston 10. Both pistons 10 and 13 can thus move in unison until piston 13 is stopped as a consequence of the engagement of plunger 31 into its groove 29. The communication between chambers 15 and 25 remains open for the rod 11 of piston 10 is moved to the right as a result of the fluid pressure exerted on valve portion 23 of said piston 10, so that the pressure limiter L is by-passed.

If as a consequence of a leakage developing in the second braking circuit 6 a pressure lower than the control pressure exerted in chamber 14 develops in the other chamber 15, the first piston 10 will move to the left without having an appreciable resistance to overcome for compressing spring 27', since the only function of this last-mentioned spring is to center the movable member 9 in its bore in conjunction with spring 27. Therefore, said spring 27' is compressed under the thrust resulting from the movement of piston 10. Thus, both pistons 10 and 13 travel to the left until piston 13 is held against axial movement as a consequence of the engagement of plunger 31 into groove 29'.

In either of the above-described cases, the light indicator or warning light 35 remains energized as long as plunger 31 engages one of said grooves 29 or 29', and the indicator may be reset manually by simply raising said plunger 31. To this end, a grip member (not shown) rigid with this plunger may be provided for lifting and resetting the indicator.

It will be noted that a similar operation of the device may be obtained when the plunger 31 is stationary and projects into the bore 8. In this case, it is only necessary to substitute a single groove having walls adapted to limit the permissible stroke of piston 13 for the pair of grooves 29 and 29', the switch operation being obtained through the axial abutment between plunger and piston.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A pressure drop indicator for a braking system comprising two independent circuits, one of said circuits comprising a pressure limiter, said indicator comprising a body formed with a bore, a movable member slidably mounted in said bore and responsive to the pressure in both circuits, said movable member actuating a control element on an electric switch and closing an electric signal circuit in case of fluid leakage in one of said circuits, said movable member comprising a first piston provided with a rod movable in a bore formed in a second piston, said second piston further actuating said electric switch control element at two axial abutment positions of said second piston, said pistons providing at the ends of said bore in said body first and second chambers to which feed lines of said first and second circuits are connected, said second circuit comprising said pressure limiter, the pressure drop indicator being characterized in that the end of the rod said first piston comprises a valve means removably closing a passage hole formed in said second piston and providing a fluid passage between said second chamber, and an auxiliary chamber in said body for supplying fluid to the second circuit and by-pass said pressure limiter when a pressure drop takes place in said first circuit and a spring disposed between the adjacent faces of said first piston and said second piston for constantly urging the valve of said first piston rod away from said second piston passage hole.

* * * * *